United States Patent Office 3,592,836
Patented July 13, 1971

3,592,836
ARYLOXYCARBONYL FLUORIDES AND AMINO ACIDS AND THEIR PRODUCTION
Ivar Ugi, Leverkusen, Erich Klauke, Odenthal, Eugen Schnabel, Wuppertal-Elberfeld, and Peter Hoffmann, Cologne-Stammheim, Germany, assignors to Farbenfabriken Bayer Aktiengesellschaft, Leverkusen, Germany
No Drawing. Filed Dec. 21, 1967, Ser. No. 692,272
Claims priority, application Germany, Dec. 23, 1966,
F 51,062; Aug. 26, 1967, F 53,338, F 53,339
Int. Cl. C07c 69/00
U.S. Cl. 260—463
3 Claims

ABSTRACT OF THE DISCLOSURE

Aryloxycarbonyl fluorides such as furfuryloxycarbonyl-, p-methoxybenzyloxycarbonyl- and trimethoxybenzyloxycarbonyl-fluorides are provided which are useful as intermediates for amino acid derivatives and are obtained from carbonyl-fluoride chloride by reaction with the appropriate alcohol. The amino acid derivatives of such carbonyl-fluorides are built up through acylation of amino acids therewith. These amino acid derivatives are useful as intermediates for the synthesis of polypeptides. The reaction of carbonylchloride-fluoride is advantageously carried out at temperatures of 0 to $-70°$ C. in an inert solvent and in the presence of an acid-binding agent. The amino acid derivatives are formed at temperatures between $+20$ and $-20°$ C. also in the presence of an acid-binding agent. Imino acids can be used in place of amino acids. The amino- or imino-acid derivatives or esters are advantageously prepared at constant, controlled pH values, preferably by the use of automatic pH control equipment.

---

It is known that the tert.-butyloxycarbonyl radical (in short BOC radical, as suggested by R. Schwyzer, J. Rudinger, E. Wünsch and G. T. Young in "Fifth European Peptide Symposium," page 261, Macmillan (Pergamon), New York, 1963) has attained great importance for the peptide chemistry as an amino protective group.

Because of the instability of the BOC chloride [F. C. McKay and N. F. Albertson, J. Amer. Chem. Soc. 79, page 4686 (1957)], the synthesis of BOC-amino acids is comparatively laborious. Admittedly, the BOC chloride can be used in situ for acylation [R. B. Woodward, K. Heusler, J. Gostelli, P. Naegler, W. Oppolzer, R. Ramage, S. Ranganathan and H. Vorbrüggen, J. Amer. Chem. Soc. 88, page 842 (1966)], but the formation of ureas with excess phosgene is possible. In practice, the BOC-amino acids are almost exclusively obtained via the BOC-p-nitrophenyl ester [G. W. Anderson and A. C. McGregor, J. Amer. Chem. Soc. 79, page 6180 (1967)] or, even more frequently, via the BOC azide [R. Schwyzer, P. Sieber and H. Kappeler, Helv. chim. Acta 42, 2622 (1959)], since acylation with the p-nitrophenyl ester fails in the case of some amino acids (cf. E. Schröder and K. Lübke in "The Peptides," volume I, page 37, Academic Press, New York-London, 1965). Most BOC-amino acids can be prepared in good yields with BOC azide and sodium hydroxide, if the acylation is carried out in an autotitrator (pH-stat) at a controlled pH value [E. Schnabel, Liebigs Ann. Chem. 702, page 188 (1967)]. The synthesis of BOC azide proceeds via several stages [L. A. Carpino, J. Amer. Chem. Soc. 79, page 98 (1957); 82, page 2725 (1960)]. The reagent is explosive [P. G. Katsoyannis and K. Hofmann in "The Proteins," volume 1, page 67, New York (1963)], and unpleasant to handle because of its strong blood vessel dilating effect. The BOC-amino acids can also be prepared from the isocyanato compounds of the amino esters with tert.-butanol by subsequent hydrolysis of the esters [J. Amer. Chem. Soc. 79, page 4686 (1957); 6180 (1957)]. Two further acylating agents for the introduction of the BOC-group have recently been described, namely, BOC-cyanoformate [H. Leplawy and W. Stee, Bull, acad. Polon., sci. Ser. sci. chim. 12, page 21 (1964)] and BOC-N-hydroxysuccinimide ester [M. Frankel, D. Ladkany, C. Gilon and Y. Wolman, Tetrahedr. Letters 39, page 4765 (1966)], but also in these cases the synthesis is rather expensive and the acylation of amino acids requires drastic conditions.

It has now been found that tert.-butyloxycarbonyl derivatives of amino acids can be produced in a particularly advantageous manner with the aid of tert.-butyloxycarbonylfluoride. The hitherto unknown BOC fluoride is substantially more stable than the BOC chloride. Compared with the sterically hindered BOC azide, the fluoride reacts under substantially milder conditions. Even at temperatures below $0°$ C., the acylations proceed in most cases almost quantitatively within one hour. The BOC derivatives of glycine, alanine, leucine, isoleucine, proline, phenylalanine, $\alpha$-carbobenzoxylysine and $\omega$-p-nitrocarbobenzoxylysine were thus obtained with the use of BOC fluoride in crystallized form and in yields of about 90%. Serine, threonine, aspartic acid and glutamic acid also smoothly react with the fluoride at pH 9.2 to 9.5 within a short time at $0°$ C. or also at room temperature, and the BOC derivatives can be isolated in yields of about 90%. This is the more surprising, as in the synthesis of the BOC derivatives of the last-mentioned amino acids the acylation with BOC-nitrophenyl ester fails, and the BOC azide reacts but slowly. However, the process presents particular advantages in those cases where the reaction with other customary acylating agents gives only poor yields because of steric hindrance. Thus, BOC-N-methyl-(dl)-valine is obtained via the BOC azide by the pH-stat process after 48 hours at pH 10.5 in a yield of 53%, whereas via the fluoride there are obtained 75% of crystallized BOC-N-methyl-(dl)-valine within 2.5 hours at pH 9.5.

The mono-esters or mono-amides of $\alpha$-aminodicarboxylic acids can also be easily acylated with the BOC fluoride with better yields than those obtained according to the other processes, since the reaction can be carried out at pH values at which a noticeable hydrolysis of the carboxylic acid derivatives does not yet take place.

The conditions for the synthesis and the physical data of some BOC-amino acids which were prepared by reaction with the BOC fluoride and NaOH with pH control are assembled in the annexed Table I.

Moreover, the reaction conditions for and the yields of the pH-controlled synthesis via the BOC azide and the BOC fluoride, respectively, are compared for various examples in the annexed Table II.

As a further advantage, the reagent offers the possibility of protecting histidine also at the imidazole groups by the tert.-butyloxycarbonyl radical. The im-BOC group is alkali-labile and is split off by anhydrous trifluoroacetic acid within 60 minutes. Analogeously L-tyrosine also may be obtained as the bis-BOC-derivative where the phenolic hydroxy group is blocked, too. Activated esters of this compound as well as of bis-BOC-L-histidine were obtained in crystalline form (Examples VI and VII). Both are very useful materials for peptide synthesis. The acylation can be carried out at room temperature, but it is particularly advantageous to work at temperatures about $0°$ C. with pH control. For example, the BOC-aspartic acid-$\beta$-benzyl ester did not crystallize when the pH value exceeded 10 for a short time during the reaction.

The reagent is also suitable for the acylation of amino acid esters. Possible amino acid partners are racemic and natural as well as synthetic L- and D-amino acids, imino acids with at least one hydrogen atom attached to the nitrogen atom, amino acids with additional carboxyl groups or amino groups. Besides the aminocarboxylic acids, aminosulphonic acids and aminophosphoric acids can also be acylated according to the present process.

By the use of p-methoxybenzyloxycarbonylazide or p-methoxybenzyl-p-nitrophenyl-carbonate [F. Weygand and K. Hunger, Chem. Ber. 95 (1962), page 1] and p-methoxybenzyl-1-piperidyl-carbonate [J. H. Jones and G. T. Young, Chemistry and Industry 1966, page 1722] it is now possible to prepare the p-methoxybenzyloxycarbonyl-

TABLE I

| Amino acids | pH | Reaction temp., °C. | Reaction time | Yield | Yield Lit. | Melting point | Melting point Lit. | $\alpha_{578}$ | | (LM) | (LM) Lit |
|---|---|---|---|---|---|---|---|---|---|---|---|
| L-alanine | 9.5 | −4 | 2 | 92 | [1] 55.5 | 81–83 | [1] 83–84 | − | 24.5 (HOAc) | − | [1] 22.4 (HOAc) |
| L-aspartic acid | 9.5 | −4 | 1.5 | 70 | [2] 34.0 | 114–116 | [2] 118–119 | − | 6.2 (Me) | − | [2] 6.2 (Me) |
| L-aspartic acid-β-benzyl ester | 8.8 | −4 | 1 | 86 | | 95–97 | | + | 7.1 (HOAc) | | |
| L-asparagine | 8.5 | −4 | 5 | 79 | { [2] 73.0 / [3] 45.0 } | 174–176 | { [2] 181–182 / [3] 200 } | − | 8.0 (DMF) | − | [3] 7.8 (DMF) |
| L-cystine | 9.2 | −4 | 2 | 80 | [4] 67.0 | 146–147 | [4] 145–146 | − | 114.6 (HOAc) | − | [4] 138.0 (Me) |
| L-glutamic acid | 9.5 | −4 | 1.5 | 84 | { [5] 58.0 / [6] 76.0 } | 110–112 | { [5] 110–112 / [6] 115 } | − | 15.6 (Me) | − | [5] 16.1 (Me) |
| L-glutamic acid-γ-benzyl ester | 8.8 | −4 | 2 | 82 | | Syrupy | | | | | |
| L-glutamine | 9.0 | −4 | 1.5 | 83 | [11] 58.0 | 112–114 | 114–118 | − | 2.9 (At) | − | [11] 3.0 (At) |
| Glycine | 9.2 | −4 | 2 | 85 | { [7] 56.0 / [1] 77.0 } | 84–86 | [1] 85–89 | | | | |
| L-isoleucine | 9.4 | −4 | 1 | 92 | [1] 9.6 | 66–68 | [1] 49–57 | + | 2.5 (HOAc) | + | [1] 3.0 (HOAc) |
| L-leucine | { 9.5 / 9.5 } | { 20 / −4 } | { 1 / 1.5 } | { 95 / 93 } | { [1] 59.0 / [8] 72.0 } | 78–81 | [2] 74–80 | − | 28.2 (HOAc) | − | [1] 24.0 (HOAc) |
| α-Carbobenzoxy-L-lysine | 9.2 | −4 | 1 | 96 | [9] 93.0 | 76–78 | Syrupy | − | 3.0 (HOAc) | | |
| ε-Carbobenzoxy-L-lysine | 9.4 | −4 | 5 | 90 | [1] 62.0 | | Syrupy | | | | |
| ε-p-Nitrocarbobenzoxy-L-lysine | 9.2 | −4 | 4 | 85 | | 103–105 | | − | 6.1 (HOAc) | | |
| L-methionine | 9.4 | −4 | 1.5 | 92 | [1] 40.0 | | Syrupy | | | | |
| N-methyl-DL-valine | 9.7 | 20 | 2.5 | 75 | | 82–84 | | | | | |
| L-phenylalanine | 9.4 | −4 | 2 | 89 | { [1] 73.0 / [8] 79.0 } | 82–83 | [1] 79–80 | − | 4.0 (HOAc) | − | [1] 0.8 (HOAc) |
| L-proline | 9.0 | −4 | 1.5 | 95 | [1] 55.0 | 132–134 | 136–137 | − | 62.5 (HOAc) | − | [1] 60.0 (HOAc) |
| L-serine | 9.5 | { 20 / −4 } | { 1.5 / 1.5 } | { 90 / 85 } | | 75–78 (12) | | − | 4.3 (HOAc) | | |
| o-Tert.-butyl-L-serine | 9.2 | −4 | 1.5 | 92 | | 126–128 | | { + / − } | 0 (HOAc) | | |
| L-threonine | 9.5 | { 20 / −4 } | { 1 / 1.5 } | { 88 / 94 } | [10] 75.0 | 74–77 | [10] 78–80 | − | 9.5 (HOAc) | − | [10] 2.5 (Me) |
| L-valine | 9.2 | −4 | 2 | 93 | { [1] 55.0 / [8] 68.0 } | 72–73 | [1] 77–79 | + | 6.0 (HOAc) | − | [1] 5.8 (HOAc) |

[1] G. W. Anderson and A. C. McGregor, J. Amer. Chem. Soc. 79, 6180 (1957).
[2] E. Schroeder and E. Klieger, Liebigs Ann. Chem. 673, 208 (1964).
[3] E. Sandrin and R. A. Boissonnas, Hel. Chim. Acta 46, 1637 (1963).
[4] I. Photaki, J. Amer. Chem. Soc. 88, 2292 (1966).
[5] E. Schroeder and E. Klieger, Liebigs Ann. Chem. 673, 196 (1964).
[6] F. Chillemi, L. Bernardi and G. Bosisio, Gazz. Chim. Ital. 94, 891 (1964).
[7] F. C. McKay and N. F. Albertson, J. Amer. Chem. Soc. 79, 4686 (1957).
[8] R. Schwyzer, P. Sieber and H. Kappeler, Helv. Chim. Acta 42, 262 (1959).
[9] R. Schwyzer, W. Rittel, Helv. Chim. Acta 44, 159 (1961).
[10] K. Hofmann, R. Schmichen, R. D. Wells, Y. Wolman and N. Yanaihara, J. Amer. Chem. Soc. 87, 811 (1965).
[11] K. Hofmann, W. L. Haas, M. J. Smithers, R. D. Wells, Y. Wolman, N. Yanaihara and G. Zanetti, J. Amer. Chem. Soc. 87, 620 (1965).
[12] Hydrate.
NOTE.—LM=solvent; HOAc=acetic acid; Me=menthanol; DMF=dimethyl formamide.

TABLE II

| | BOC azide (pH control) | | | | BOC fluoride (pH control) | | | |
|---|---|---|---|---|---|---|---|---|
| | Reaction conditions | | | Yield, percent | Reaction conditions | | | Yield, percent |
| Amino acids | pH | Temp., °C. | Time, hrs. | | pH | Temp., °C. | Time, hrs. | |
| L-aspartic acid | 10–2 | 20 | 26 | 68 | 9.5 | −4 | 1.5 | 70 |
| L-aspartic acid-β-benzyl ester | 9–8 | 22 | | ([1]) | 8.8 | −4 | 1 | 86 |
| L-asparagine | 9–9 | 21 | 26 | [2] 72 | 9.0 | −4 | 3.5 | 79 |
| L-glutamic acid | 10–0 | 19 | 13 | 97 | 9.5 | −4 | 1.5 | 84 |
| L-glutamic acid-α-benzyl ester | 9–8 | 20 | | ([1]) | 8.8 | −4 | 2 | 83 |
| ε-p-Nitrocarbobenzoxy-L-lysine | 9–9 | 22 | 12 | [3] 96 | 9.2 | 20 | 4 | 85 |
| L-phenylalanine | 10–1 | 20 | 13.5 | 91 | 9.4 | −4 | 2 | 89 |
| L-serine | 9–3 | 20 | 29 | 85 | 9.5 | −4 | 1–5 | 90 |
| L-threonine | 9–5 | 22 | 30 | 88 | 9.5 | −4 | 1–5 | 94 |
| N-methyl-DL-valine | 10–5 | 25 | 48 | 53 | 9.7 | 20 | 2.5 | 75 |

[1] Under these conditions the ω-benzyl ester is extensively hydrolysed.
[2] Ammonia escapes from the reaction vessel.
[3] Product did not crystallize.

An essential precondition for the usefulness of acyl radicals as protective groups for the temporary blocking of the amine functions in the peptide synthesis is their capability of being split off under conditions which do not attack either peptide bonds or side chains of the constituting amino acids. There are recently used for this purpose mainly urethane protective groups which can readily be split off acidolytically (cf. E. Schroeder and K. Luebke: "The Peptides," vol. I, page 39, Academic Press, New York-London 1965). Besides the tert.-butyloxycarbonyl group [F. C. McKay and N. F. Albertson, J. Amer. Chem. Soc. 79, (1957) page 4686 as well as G. W. Anderson and A. C. McGregor, J. Amer. Chem. Soc. 79, (1957) page 6180] the p-methoxybenzyloxycarbonyl group which in addition may be split off by catalytic hydrogenation acquires increasing importance. [F. C. McKay and N. F. Albertson, J. Amer. Chem. Soc. 79, (1957) page 6180].

amino acids of trifunctional amino acids, whereas it was previously necessary to react isocyanatocarboxylic acid esters, produced from amino acid esters with phosgene, with p-methoxy alcohol to give the desired urethanes. After saponification the p-methoxybenzylcarbonyl chloride are unstable and could not be synthesized [F. C. McKay and N. F. Albertson, J. Amer. Chem. Soc. 79 (1957), page 4686].

It has now been found that the previously unknown p-methoxybenzyloxycarbonyl fluoride, contrary to the analogous chloride, is stable at temperatures of about 0° C. for a fairly long time. Only above 35° C. it does decompose spontaneously with the evolution of $CO_2$. The compound is obtained according to the invention with good yields according to the formula scheme 1 in methylene chloride at temperatures between ±0 and −70° C. from carbonylchloridefluoride and p-methoxybenzyl alcohol in an inert solvent in the presence of acid-binding agents such as metal oxides, hydroxides and tertiary bases, preferably pyridine:

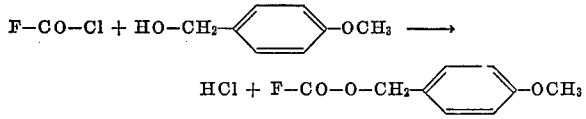

(1)

The carbonylchloride fluoride is obtained by fluorination of phosgene according to known methods. It can be used as a crude material which contains unchanged phosgene and fluorophosgene.

After precipitation with ether, the pyridine hydrochloride can be separated by filtration and the desired fluoride is obtained as a colorless oil after removal of the solvent.

It has further been found that p-methoxybenzyloxycarbonyl-fluoride is outstandingly suitable for acylating amino acids and their partially protected derivatives in the presence of acid-binding agents, in an aqueous or organic suspension or in solvent mixtures, at temperatures ranging from $-20$ to $+20°$ C. It is not necessary for this purpose to isolate the reagent in pure form. As amino acid or imino acid components there can be used all natural as well as synthetic, optically active or racemic compounds of the formula:

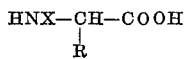

wherein X is H or R, which still contain at least one exchangeable hydrogen atom in the amino or imino group. The radical R can be of aliphatic or aromatic nature or may also be heterocyclic and may contain additional functional groups such as $-NH_2$, $-OH$ or carboxyl radicals. Obviously $\beta$, $\gamma$, $\delta$ and branched amino acids are also suitable as reaction components. Some examples are set out in the following table.

It is of advantage to maintain the pH during the reaction constant by means of an autotitrator. In comparison with the known p-methoxybenzyloxy-carbonylation agents initially mentioned, it also possesses the advantage that the reactions proceeds at low temperatures and low pH values, i.e., under unusually mild conditions in a comparatively short time (cf. Table III) and with good yields (cf. Table III). Furthermore, a bis-acyl derivative can be obtained from histidine and the phenolic hydroxyl group in tyrosine can also be blocked.

The furfuryloxycarbonyl radical disclosed by a publication of Losse and coworkers [H. Jeschkeit, G. Losse and K. Neubert, Chem. Ber. 99 (1966), page 2803] has become available for the peptide chemistry as a further amino protective group which can especially readily split off acidolytically.

A critical investigation concerning the usefulness of this group for the synthesis of peptides has hitherto been made difficult particularly by the relatively cumbersome method of production of furfuryloxycarbonyl amino acids. Since the furfuryloxycarbonyl chloride could not be prepared, Jeschkeit, Losse and Neubert have obtained these derivatives via isocyanato-fatty acid esters by the reaction with furfuryl alcohol and subsequent hydrolysis of the esters. According to this process requiring several steps and thus being time-consuming, only the furfuryloxycarbonyl derivatives of bi-functional amino acids were hitherto available. In the case of tri-functional amino acids, the process failed to work because of side reactions of the third functional group during the reaction with phosgene or in the subsequent hydrolysis.

It has now also been found that the previously unknown furfuryloxycarbonyl-fluoride can be obtained in almost quantitative yield at temperatures of $-30$ to $-70°$ C. from carbonylchloride-fluoride and furfuryl alcohol in an inert solvent and in the presence of acid-binding agents such as metal oxides or hydroxides or tertiary bases, preferably pyridine. This compound is stable in solution for a fairly long time at temperatures below $-30°$ C. The solution slowly darkens already at $0°$ C., while decomposition occurs at room temperature with vigorous $CO_2$ evolution.

The carbonylchloride-fluoride is obtained by fluorination of phosgene according to known methods. It can be used as a crude product containing unchanged phosgene and fluorophosgene.

The furfuryloxycarbonyl-fluoride is eminently suitable for the synthesis of furfuryloxycarbonyl-amino acids which can readily be crystallized and isolated as dicyclohexylammonium salts. The reactions are carried out in the presence of acid-binding agents at temperatures of $10°$ C. to $-20°$ C., preferably at $-5°$ C. to $0°$ C. They proceed very rapidly and with high yields, particularly when the reactions are conducted with pH control.

Some examples are given in subsequent Table IV.

As can be seen from Table IV, the derivatives of tri-functional amino acids are also readily obtainable in this way. As amino acid components there may be used natural and synthetic, racemic and optically active amino acids or imino acids or aminosulphonic acids with or without side chains, which still contain at least one replaceable hydrogen atom in the amino or imino group.

As shown in the examples, the side chains may also contain additional functional groups. In the case of histi-

TABLE III

[Synthesis of some p-methoxybenzyloxycarbonyl-(MZ)aminoacids with the use of p-methoxybenzyloxycarbonylfluoride by the pH-stat.-process

| Aminoacid | pH-value | Reaction time, hrs. | | Yield, percent | | Melting point, °C. | | $[\alpha]_{578}$ (solvent) | | Empirical formula, m. | Analysis, percent | | | | | |
|---|---|---|---|---|---|---|---|---|---|---|---|---|---|---|---|---|
| | | | | | | | | | | | Calculated | | | Found | | |
| | | | Lit. | | Lit. | | Lit. | | Lit. | | C | H | N | C | H | N |
| Glycine [1] | 8.5 | 1.5 | 49 | 69 | 76 | 94-96 | 94-96 | | | $C_{11}H_{13}NO_5$ (239-21) | 55.22 | 5.47 | 5.85 | 55.48 | 5.48 | 5.05 |
| Asparagine [2] | 8.3 | 2.5 | 96 | 67 | 57 | 149-151 | 158-159 | d $-5.1$ | ᵒd $-5.3$ | $C_{13}H_{16}N_2O_6$ (296-28) | 52.70 | 5.44 | 9.45 | 52.55 | 5.33 | 9.46 |
| Serine [1] | 8.3 | 2.0 | 40/80 | 76 | 80/95 | 92-94 | 97-98 | ᵉ $+5.8$ | ᵉ $+7.1$ | $C_{12}H_{15}NO_6$ (269-25) | 53.45 | 5.62 | 5.21 | 53.72 | 5.63 | 4.99 |
| Methionine [1] | 8.5 | 2.5 | 52 | ᵃ 86 | ᵃ 45 | ᵃ 148-150 | ᵃ 152-153 | $+4.9$ | d $+3.35$ | $C_{26}H_{42}N_2O_7S$ (494-69) | 63.12 | 8.56 | ᶜ 5.66 | 63.26 | 8.65 | ᶜ 5.61 |
| Aspartic acid [1] | 8.5 | 1.5 | 68 | 72 | 68 | 120-122 | 122.5-124 | ᵉ $+6.9$ | ᵉ $+7.1$ | $C_{13}H_{15}NO_7$ (297-26) | 52.52 | 5.08 | 4.71 | 52.77 | 5.37 | 5.02 |
| Glutamic acid-$\gamma$-benzyl ester [3] | 8.3 | 2.0 | 2 | ᵃ 89 | ᵃ 89.5 | ᵃ 150-151 | ᵃ 146-147 | d $+4.5$ | d $+4.2$ | $C_{33}H_{46}N_2O_7$ (587-72) | 68.05 | 7.96 | 4.83 | 67.96 | 7.82 | 4.97 |

ᵃ Crystallised and characterised as DSHA-salts.
ᵇ [α]ᴅ.
ᶜ S: Calc.=6.48; found=6.14.
ᵈ Methanol.
ᵉ Glacial acetic acid.

[1] F. Weygand and K. Hunger, Chem. Ber. 95 (1962), page 1.
[2] E. Schröder and E. Klieger, Liebigs Ann. Chem. 673 (1964), page 208.
[3] F. Weygand and K. Hunger, Chem. Ber. 95 (1962), page 7.

dine a bis-aryl derivative is obtained; the phenolic hydroxyl group of tyrosine can also be acylated in the same way.

TABLE IV
[Synthesis of some furfuryloxycarbonyl-(FOC)-aminoacids by means of furfuryloxycarbonyl-fluoride in the pH-stat.]

| Amino acid | pH-value | Reaction time, hrs. | Yield, percent | | Melting point | | $[\alpha]_{578}$ (solvent) | $[T]_D$ lit. (solvent) | Empirical formula, mg. | Analysis, percent | | | | | |
|---|---|---|---|---|---|---|---|---|---|---|---|---|---|---|---|
| | | | | | | | | | | Calculated | | | Found | | |
| | | | | Lit.[1] | | Lit.[2] | | | | C | H | N | C | H | N |
| Glycine | 8.5 | 1.5 | 78 | 52 | [3] 130 | | | | $C_{20}H_{32}N_2O_5$ (380.48) | 63.15 | 8.48 | 7.36 | 63.19 | 8.50 | 7.33 |
| L-alanine | 8.5 | 1.0 | 67 | 67 | [4] 172–174 | 157–158 | [10] +5.3 | [10] +5.77 | $C_{21}H_{34}N_2O_5$ (394.50) | 63.93 | 8.69 | 7.10 | 64.45 | 8.93 | 6.92 |
| L-valine | 8.5 | 1.5 | 95 | 95 | [5] 150–152 | 156–159 | [10] +4.5 | [10] +6.00 | $C_{23}H_{38}N_2O_5$ (422.55) | 65.37 | 9.06 | 6.63 | 65.41 | 9.17 | 6.48 |
| L-leucine | 8.5 | 1.5 | 75 | 55 | [6] 136–138 | 142–143 | [10] −4.5 | [10] −4.37 | $C_{24}H_{40}N_2O_5$ (436.58) | 66.02 | 9.24 | 6.42 | 66.09 | 9.26 | 6.35 |
| L-serine [2] | 8.8 | 1.5 | 70 | | [4] 167–169 | | [10] +8.7 | | $C_{21}H_{34}N_2O_6$ (410.50) | 61.44 | 8.35 | 6.83 | 61.49 | 8.34 | 6.86 |
| L-asparagine [2] | 8.3 | 2.5 | 73 | | [7] 160–162 | | [8] −10.8 | | $C_{10}H_{12}N_2O_6$ (256.22) | 46.86 | 4.73 | 10.93 | 47.42 | 5.03 | 10.88 |
| L-glutamine [2] | 8.5 | 1.5 | 58 | | [9] 138–140 | | [10] +11.0 | | $C_{23}H_{37}N_3O_6$ (451.54) | 61.18 | 8.26 | 9.31 | 61.23 | 8.63 | 8.97 |
| L-glutamic acid-γ-benzyl ester.[2] | 8.6 | 2.5 | 76 | | [5] 118–120 | | [10] +13.2 | | $C_{30}H_{91}N_2O_7$ (541.65) | 66.40 | 7.80 | 5.16 | 66.49 | 7.96 | 5.23 |

[1] The yields according to the literature here relate to the reaction of amino acid esters and subsequent hydrolysis.
[2] These derivatives are not obtainable according to the method given in the literature.
[3] Recrystallized from ethyl acetate.
[4] Recrystallized from ethanol.
[5] Recrystallized from ethyl acetate/petr. ether.
[6] Recrystallized from petr. ether.
[7] Recrystallized from ethanol ether.
[8] DMF.
[9] Recrystallized from ethyl acetate/ether.
[10] Ethanol.

NOTES:
The reactions were carried out at 0 to −5° C. in 50% dioxan. All derivatives, except FOC-asparagine, were isolated and characterised as dicyclohexyl-ammonium salts C; FOC-glycine and FOC-alanine additionally also as free acids.
Lit.: H. Jeschkeit, G. Losse and K. Neubert, Chem. Ber. 99 (1966), page 2803.

Amino acid derivatives disclosed herein and prepared according to procedures within set forth are in particular useful for the synthesis of Physalaemine [V. Erspamer, A. Anastasi, G. Bertacc and J. M. Cei, Experientia 20, 489 (1964)] and for the highly active octapeptidamide [L. Bernardi, G. Bosisio, F. Chillemi, G. de Caro, R. de Castiglione, V. Erspamer and O. Goffredo, Experientia 22, 29 (1966)] according to the following synthesis schemes:

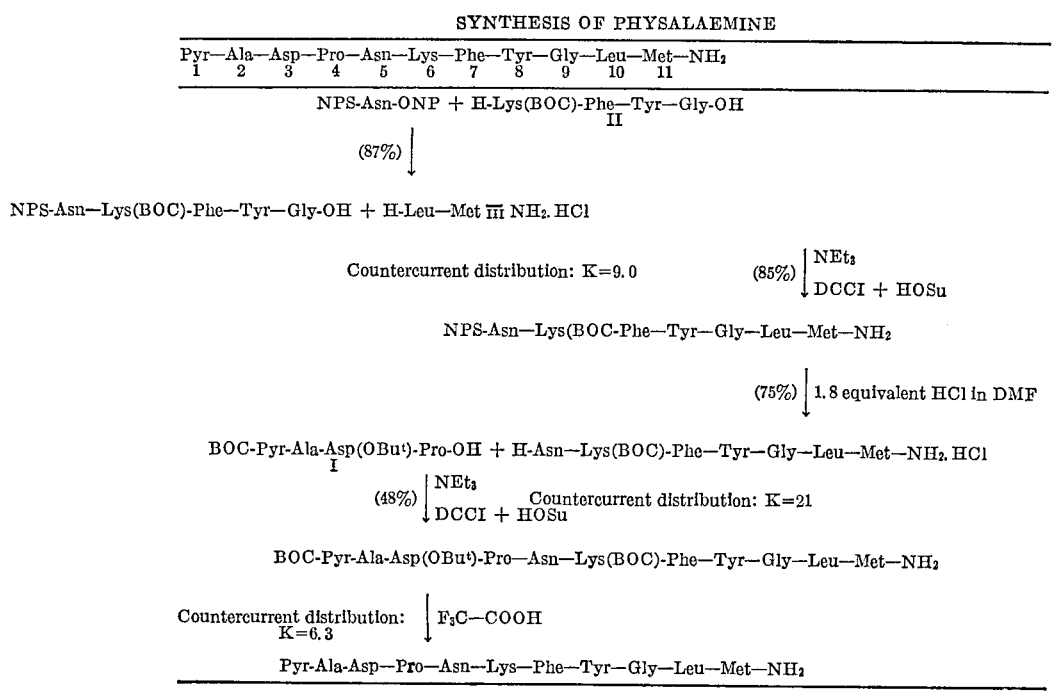

9

Synthesis of BOC-Pyr-Ala-Asp(OBuᵗ)-Pro-OH
(Sequence 1-4)

Z-Asp(OBuᵗ)-OSu + H-Pro-OH (57%) ↓ (CH₃)₃-Si-HN-CO-CH₃

Z-Asp(OBuᵗ)—Pro-OH

↓ H₂/Pd

Z-Ala-OSu + ⟨ H-Asp(OBuᵗ)—Pro-OH ⟩

(83%) ↓ (CH₃)₃—Si—HN—CO—CH₃

Z-Ala—Asp(OBuᵗ)—Pro-OH

Countercurrent distribution:
K=1.14  ↓ H₂/Pd

BOC-Pyr-OSu + ⟨ H-Ala—Asp(OBuᵗ)—Pro-OH ⟩

(62%) ↓

BOC-Pyr—Ala—Asp(OBuᵗ)—Pro-OH

Countercurrent distribution:
K=2.43

"OPTIMAL" Synthesis of H-Lys(BOC)-Phe-Tyr-Gly-OH
(Sequence 6-9)

H-Lys(BOC)—Phe—Tyr—Gly—OH

BOC-Tyr(BZL)-OSu + H-Gly—OBZL (93%) ↓

BOC-Tyr(BZL)—Gly—OBZL

10

(100%) ↓ HCl—ether

H—Tyr(BZL)—Gly—OBZL.HCl (85%) ↓ NEt₃/BOC-Phe-OSu

BOC-Phe—Tyr(BZL)—Gly—OBZL (92%) ↓ HCl-ether

H-Phe—Tyr(BZL)—Gly—OBZL.HCl (85%) ↓ NEt₃/Z-Lys(BOC)/HOSu/DCCI

Z-Lys(BOC)—Phe—Tyr(BZL)—Gly—OBZL (94%) ↓ H₂/Pd

H-Lys(BOC)—Phe—Tyr—Gly—OH

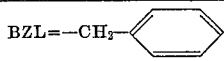

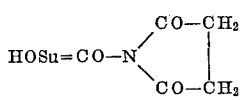

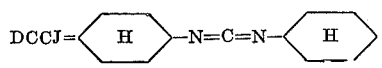

SYNTHESIS OF THE C-TERMINAL OCTAPEPTIDAMIDE
OF PHYSALAEMINE

| H | Pro 4 | Asn 5 | Lys 6 | Phe 7 | Tyr 8 | Gly 9 | Leu 10 | Met 11 | NH₂ |
|---|---|---|---|---|---|---|---|---|---|

Z-Asn-ONP + H Lys(BOC)—Phe—Tyr—Gly OH      BOC-Leu-OSu + H-Met—OMe (84%) ↓                                     (89%) ↓

Z-Asn—Lys(BOC)—Phe—Tyr—Gly-OH               BOC-Leu—Met—OMe

Countercurrent distribution:
K=2.55

(83%) ↓ H₂/Pd                               (82%) ↓ NH₃/methanol

H-Asn—Lys(BOC)—Phe—Tyr—Gly-OH               BOC Leu—Met—NH₂

(64%) ↓ BOC-Pro-OSu                         (98%) ↓ HCl/dioxane

BOC-Pro—Asn—Lys(BOC)—Phe—Tyr—Gly-OH    +    H—Leu—Met-NH₂.HCl

Countercurrent distribution:
K=6.3

(85%) ↓ NEt₃/DCCI/HOSu

BOC-Pro—Asn—Lys(BOC)—Phe—Tyr—Gly—Leu—Met-NH₂

Countercurrent distribution:
K=3.4

(100%) ↓ F₃C-COOH

H—Pro—Asn—Lys—Phe—Tyr—Gly—Leu—Met-NH₂.2TFE

A further phase of the invention comprises the 3,4,5-trimethoxybenzyloxycarbonyl protective radical for building amino acid sequences and polypeptides as illustrated by the following and by Examples XII to XV.

The 3,4,5-trimethoxybenzyloxycarbonyl radical as amino protective group

As known, it is necessary to block temporarily with a protective group those functional groups during peptide synthesis with defined amino acid sequence which should not react. For this purpose only such groups are suitable which can be split off again under mild conditions without attacking the peptide bonds or side chains of the constituted amino acids being thereby.

For the synthesis of complicated peptides protective groups which may be removed selectively one after the other are particularly important since in this way it is possible to free the N-terminal amino group or a side chain amino group.

In the hitherto unknown 3,4,5-trimethoxybenzyloxycarbonyl group (TMZ-radical) a protective group was found which can be selectively split off in the presence to the other urethane-type protective groups. This group can be removed under mild acidolytic conditions by catalytic hydrogenation or photolysis, as may be seen from the following stability table.

The thus obtained TMZ-amino acid esters have to be hydrolyzed thereafter. In this way the derivatives of the bifunctional amino acids are obtainable. In principle, the procedure via activated esters of trimethoxybenzyloxycarbonic acid can also be followed, but it is extremely simple and convenient and good yields can be obtained by the reaction of amino acids with trimethoxybenzyloxycarbonylfluoride. This hitherto unknown reagent is readily available from 3,4,5-trimethoxybenzyl alcohol and fluorophosgene in inert solvents, preferably in the presence of tert. bases such as pyridine according to the following equation:

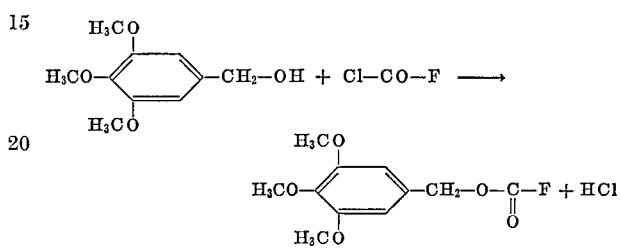

TABLE V
[Conditions for splitting off of some urethane protective groups]

| Treatment | Radical (abbreviation) | | | | |
|---|---|---|---|---|---|
| | Benzyloxy-carbonyl (Z) | 4-methoxy-benzyloxy-carbonyl (MZ) | 3,5-dimethoxy-benzyloxycarbonyl (DMZ) | 3,4,5-trimethoxybenzyloxycarbonyl (TMZ) | Tert. butyloxycarbonyl (BOC) |
| (A) Acidolysis: | | | | | |
| HBr glacial acetic acid | + | + | + | + | + |
| HCl-dioxane | − | + | − | + | + |
| Trifluoro acetic acid | − | + | − | + | + |
| Formic acid | − | + | − | + | + |
| (B) Catalytic hydrogenation | + | + | + | +[1] | − |
| (C) Photolysis | + | − | + | +[2] | − |

[1] Hydrogenation of 50 mg. of TMZ-Asn-OH in 10 ml. of 80% methanol with Pd-Mohr as catalyst was readily completed within 10 minutes.
[2] The photolytic splitting off of the TMZ-radical occurs more rapidly than that of the DMZ-group.

As can be seen from Table V, selective splitting off of the trimethoxybenzyloxycarbonyl group is possible in presence of the Z-[1] group as well as the BOC-group.

The synthesis of trimethoxybenzyloxycarbonylamino acids is successfully carried out using the isocyanates [W. Siefken, Liebigs Ann. Chem. 562, 105 (1949)] prepared from amino acid esters by reaction with trimethoxybenzyl alcohol.

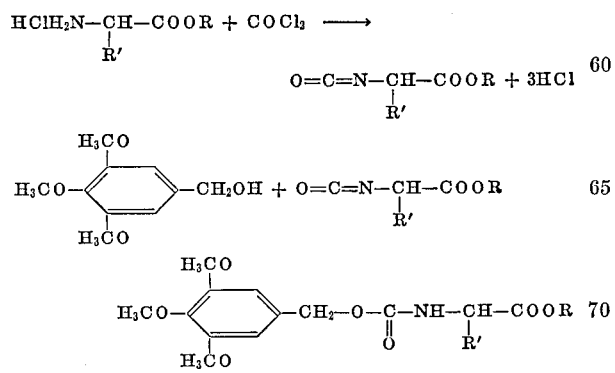

[1] Abbreviations according to suggestions in the "Proceedings of the Fifth European Peptide Symposium," 1963 (Oxford: Pergamon Press).

After filtration from the pyridine hydrochloride and concentration in vacuum it was obtained in almost quantitative yield as a crystalline compound. This proved to be stable in contrast to the acid chloride for longer periods if kept in the icebox.

Acylation of amino acids with this acylfluoride can be carried out easiest in dioxene-water at temperatures of between −20 and +20° C. and particularly at temperatures of about −5° C. To neutralize the HF, bases such as tert. amines, metal oxides or carbonates or hydroxides, respectively, are used in which case it is particularly simple to carry out the reaction under pH control. Thereby the hitherto unknown TMZ-amino acids are obtained in good yields. Occasionally it is preferable to use dicyclohexylammonium salts for their isolation and purification. The results are summarized in Table VI. In the case of histidine as well as in the case of tyrosine, bis-trimethoxybenzyloxycarbonyl derivatives were obtained, in the latter case accompanied by the mono-acyl derivative. Both compounds were separated by countercurrent distribution.

The process is suitable for acylation of neutral, acidic and basic, optically active or racemic amino acids. The derivatives obtained serve as starting materials for peptide syntheses.

TABLE VI.—3,4,5-TRIMETHOXYBENZYLOXYCARBONYLAMINO ACIDS

| Amino acids | Reaction conditions | | | | $\alpha_{578}$ in DMF | Empirical formula | Analysis | | | | | |
|---|---|---|---|---|---|---|---|---|---|---|---|---|
| | | | | | | | Calculated | | | Found | | |
| | pH | Time, (hrs.) | Yield, percent | M.P. | | | C | H | N | C | H | N |
| Gly | 8.5 | 2 | 62 | 145–147 [a] | | $C_{25}H_{40}N_2O_7$ [a] | [a] 62.35 | [a] 8.39 | [a] 5.83 | 62.32 | 8.37 | 5.00 |
| Asn | 8.5 | 2 | 58 | 164–165 | −6.0 | $C_{15}H_{20}N_2O_8$ | 50.55 | 5.66 | 7.86 | 50.50 | 5.64 | 7.86 |
| Tyr [b] | 8.3 | 2 | 25 | 146–148 [a] | [a]+2.2 | $C_{32}H_{40}N_2O_8 \cdot H_2O$ | [a] 63.43 | [a] 8.49 | [a] 4.63 | 63.59 | 8.91 | 4.46 |
| | | | 67 | Syrupy [b] | | | | | | | | |
| Asp | 8.5 | 1.5 | 72 | 148–150 | −25.2 | $C_{15}H_{19}NO_9 \cdot \frac{1}{2}H_2O$ | 50.41 | 5.36 | 3.92 | 50.78 | 5.54 | 4.14 |
| Lys [b] | 8.9 | 1.5 | 83 | Syrupy | −8.3 | $C_{28}H_{38}N_2O_{12}$ | 55.52 | 6.49 | 4.63 | 55.58 | 6.44 | 4.25 |
| His [b] | 8.3/6.8 | 3 | 58 | Amorphous (50) | −3.5 | $C_{28}H_{33}N_2O_{12}$ | 55.72 | 5.52 | 6.95 | 55.73 | 6.14 | 5.99 |

[a] Characterized as DCHA-salts. [b] Here the bis-acyl derivatives were obtained.

The invention is illustrated by the following non-limitative examples.

EXAMPLE I

BOC-L-aspartic acid 3.3 g. of aspartic acid were suspended in a mixture of 5 ml. of dioxan and 5 ml. of $H_2O$ and cooled to −4° C. A total of 6 ml. of crude BOC fluoride (appr. 60%) were then added in 3 portions with vigorous stirring and a pH of 9.5 was maintained by means of an autotitrator. The uptake of alkali was completed after 30 minutes. After a further 60 minutes the mixture was filtered off from a small amount of precipitate, washed with a little water and the still alkaline solution was extracted with 30 ml. ether. The solution was then cooled to 0° C. and acidified by the addition of solid citric acid. The mixture was then extracted with a total of 150 ml. of sec.-butanol in 3 portions and the extracts were washed three times with 10 ml. portions of a saturated NaCl solution and finally twice with 5 ml. portions of water. The butanol was then distilled off in a vacuum and the remaining oil was dissolved in ethyl acetate, filtered and mixed with petroleum ether. Upon evaporation of the solution, 4.1 g. of the compound crystallized and were thoroughly washed with petroleum ether. Yield: 71%; M.P. 114 to 116° C. $[\alpha]_{578}$ −6.2; for literature cf. Table I.

EXAMPLE II

BOC-L-aspartic acid-β-benzyl ester 4.5 g. of aspartic acid-β-benzyl ester were suspended in a mixture of 5 ml. of dioxan and 5 ml. of $H_2O$ and after cooling to −4° C. reacted at pH 8.8 with a total of 6 ml. of crude BOC fluoride, while maintaining a pH of 8.8±0.2 by the automatic addition of 4 N NaOH. The reaction was completed after one hour. After stirring for an additional hour, the mixture was filtered off with suction from a small amount of precipitate, the filtrate acidified with solid citric acid and the oil separated by extracting three times with 30 ml. portions of ethyl acetate. The combined extracts were repeatedly washed with 10 ml. portions of $H_2O$ and the ethyl acetate was removed in a vacuum. 6.5 g. (100%) of the desired product remained in crystalline form. After recrystallization from ethyl acetate/petroleum ether, there were obtained 5.55 g. (86%) of M.P. 95 to 97° C.; $R_{F\,SBN}$ 0.62; $[\alpha]_{578}$+7.1 (c.=1; glacial acetic acid).

EXAMPLE III

BOC-L-glutamic acid-γ-benzyl ester 5.4 g. of glutamic acid-γ-benzyl ester were suspended in 10 ml. of a 1:1 mixture of dioxan and water and reacted at pH 8.8 with a total of 6 ml. of crude BOC fluoride. The material slowly dissolved. After 1.5 hours, the product was filtered off with suction—pH 9.2—and well rinsed with $H_2O$. Besides a small amount of unreacted glutamic acid-γ-benzyl ester ($R_{F\,SBA}$+ 0.60) the residue chiefly contained free glutamic acid ($R_{F\,SBA}$ 0.12) formed by hydrolysis of the γ-ester, as well as traces of the desired compound. After extracting the reaction solution with 30 ml. of ether, the aqueous phase was acidified with citric acid and extracted with a total of 100 ml. of methylene chloride in three portions. The methylene chloride solution was washed several times with 10 ml. portions of $H_2O$ and finally concentrated in a vacuum. The desired compound remained as a colorless syrup; $R_{F\,SBN}$ 0.64. Yield: 6.4 g. which was characterized as the crystalline dicyclohexylammonium salt, M.P. 140 to 142° C.

$C_{29}H_{56}N_2O_6$ (518.68). Calculated (percent): C, 67.15; H, 8.94; N, 5.40. Found (percent): C, 66.85; H, 8.99; N, 5.56.

EXAMPLE IV

BOC-L-serine 5.7 g. of serine were suspended in 10 ml. of dioxan and 10 ml. of 4 N NaOH, followed by 15 ml. of crude BOC fluoride (40%) were added while cooling to −15° C. The mixture was stirred with initial cooling for two hours at room temperature while maintaining a pH of 9.5. After filtering off with suction from a slight turbidity, the filtrate was extracted with 30 ml. of ether, acidified with citric acid and after the addition of sodium chloride, extracted four times with 30 ml. portions of ethyl acetate. The combined extracts were repeatedly washed with 10 ml. portions of saturated sodium chloride solution and finally twice with 10 ml. portions of water. After removal of the solvent in a vacuum, there were obtained 9.3 g. of a syrupy residue (90%) with a $R_{F\,SBN}$ of 0.42. The syrup completely crystallized upon standing. The hydrate formed, melted at 75 to 78° C.; $[\alpha]_{578}^{22}$−4.3; (c.=1, in glacial acetic acid).

EXAMPLE V

BOC-N-methyl-DL-valine 5.75 g. of N-methyl-DL-valine were suspended in 10 ml. of 50% dioxan, the suspension was cooled to −20° C. and 15 ml. of BOC fluoride were added. The mixture was stirred with initial cooling at pH 9.7 and then allowed to reach room temperature. After 2.5 hours the mixture was filtered off with suction from a flocculent precipitate and the filtrate extracted with 30 ml. of ether. The mixture was then acidified with citric acid and the solution was extracted with 120 ml. of ether in three portions. The ethereal phases were deacidified by washing three times with 10 ml. portions of water, and the ether was distilled off in a vacuum. As residue there remained 10 g. of a slightly yellow oil (94%) which eventually crystallized under petroleum ether. Yield: 8.1 g. (75%) of M.P. 81 to 83° C.: $R_{F\,SBN}$ 0.62.

All other derivatives of Table I were prepared in an analogous manner under the conditions stated in the compilation.

(+) SBN=85 parts by volume of sec.-butanol and 15 parts by volume of 10% ammonia.

SBA=75 parts by volume of sec.-butanol and 15 parts by volume of water and 10 parts by volume of 90% formic acid.

EXAMPLE VI

Bis-BOC-histidine 21 g. of L-histidine-monohydrochloride-monohydrate (0.1 mole) were suspended in 100 ml. of 50% dioxane and after cooling to −5° C. there were introduced 35 ml. of crude BOC-fluoride (approx. 40%) slowly and under vigorous stirring. The pH of the solvent was maintained constant at 8.3 by the addition of 4 N NaOH with the aid of an autotitrator. After 2 hours further 35 ml. of the BOC-fluoride solution weree added and the reaction was continued at pH 6.8 in the autotitrator. After another four hours the reaction solution was cleared by filtration and the filtrate was extracted repeatedly with 100 ml. of ether each time. Now the aqueous phase was acidified with citric acid and the BOC-His(BOC)-OH extracted with a total of 400 ml. ether in several portions. The combined extracts were washed several times with water and finally concentrated under vacuum. The syrup thus remaining solidified during drying in the vacuum over $P_2O_5$/ KOH to an amorphous foam: yield 32.1 g. (88%), M.P. 75 to 80° C. $[\alpha]_{578}^{23}$−1.5° (c.=1, in acetic acid).

*Analysis.*—$C_{16}H_{25}N_3O_6 \cdot 0.5H_2O$ (364.39). Calculated (percent): C, 52.75; H, 7.19; N, 11.53. Found (percent): C, 53.16; H, 7.29; N, 11.45.

For further characterization the p-nitro-phenyl ester as well as the N-hydroxysuccinimide ester were prepared. Both derivatives are valuable intermediates for peptide synthesis.

(A) BOC-His(BOC)-ONP: 36.4 g. of the above product were dissolved in 100 ml. of absolute tetrahydrofuran and 14 g. of p-nitrophenol were added. The solution was cooled to −5° C. 20.6 g. of dicyclohexyl carbodiimide were then added and the reaction mixture was kept in the icebox with occasional shaking. After 5 hours it was filtered from the separated dicyclohexylurea (22.2 g.), washed well with tetrahydrofuran and the filtrate concentrated under a vacuum. The crystallized residue was dissolved in 30 ml. of methylenechloride. 300 ml. of petroleum ether were added and finally filtered off after several hours of standing in the icebox. The crystals were washed with ether/petroleum ether (1:1) and then with some diisopropylether. The crystals (31, 65%) melted at 141 to 143° C. A second crop of 3.3 g. (7%) of the compound crystallized on evaporation of the mother liquor. Total yield: 34.3 g. (72%). A sample melted after recrystallization from acetonitrile/diisopropylether at 142 to 144° C.; $[\alpha]_{578}^{22}$−22.8° (c.=1, dioxane).

$C_{22}H_{28}N_4O_8$ (476.47). Calculated (percent): C, 55.45; H, 5.93; N, 11.76. Found (percent): C, 55.57; H, 5.97; N, 11.71.

(B) BOC-His(BOC)-OSu: To a solution of 7.3 g. of amorphous bis-BOC-histidine and 2.3 g. of N-hydroxysuccinimide in 30 ml. of tetrahydrofuran, 4.2 g. of dicyclohexylcarbodiimide were added at a temperature of 0° C. and the reaction solution was kept in the icebox overnight. It was then filtered off from the precipitated dicyclohexylurea (4.3 g., 94%) and the filtrate was concentrated in a vacuum. Under ether 2.2 g. of colorless crystals were obtained with a M.P. of 112 to 114° C. These were recrystallized from methylene chloride/petroleum ether and finally 1.9 g. (21%) of the desired activated ester were obtained. M.P. 115–117° C.; $[\alpha]_{578}^{23}$−2.8° (c.=1, in dioxane).

$C_{20}H_{28}N_4O_8$ (425.45). Calculated (percent): C, 53.09; H, 6.22; N, 12.38. Found (percent): C, 53.06; H, 6.45; N, 12.07.

EXAMPLE VII

Bis- and mono-BOC-Tyrosine (BOC-Tyr(BOC)-OH and BOC-Tyr-OH)

3.6 g. of L-tyrosine were suspended in 20 ml. of 50% aqueous dioxane and reacted with 15.5 ml. of crude BOC-fluoride (40%) in an autotitrator at −5° C. and at pH 10.3 with the addition of 4 N NaOH. After an hour the temperature of the reaction solution was allowed to come to room temperature and the reaction mixture was worked up as usual. A yellowish oil which resulted therefrom was subjected to a countercurrent distribution in the system methanol (8):water (2):chloroform (5):toluene (5).

There were obtained two syrupy compounds with distribution coefficients of K=0.57 (4.8 g.) and K=3.4 (2.8 g.).

The compound with distribution coefficient 0.57 can be obtained as the sole product in 93% yield (related to the tyrosine) and crystallizes on rubbing with petroleum ether, if the reaction is carried out at a pH of 9.3. The colorless crystals melt at 92 to 94° C.; $[\alpha]_{578}^{22}$+28.7° (c.=1, in dioxane).

$C_{19}H_{27}NO_7$ (381.42). Calculated (percent): C, 59.83; H, 7.13; N, 3.68. Found (percent): C, 59.56; H, 7.26; N, 3.71.

The composition of the reaction product at higher pH values was shifted in favor of the derivative with higher K-value. For characterization both compounds were converted to their crystalline dicyclohexylammonium salts under ether. From the compound of K-value 0.57 there was obtained 4.7 g. of the salt of the Bis-BOC compound (42%) (related to tyrosine) or M.P. 111 to 113° C. $[\alpha]_{578}^{30}$+39.2° (c.=0.5, in dioxane), +26° (c.=1, in dimethylformamide).

$C_{31}H_{49}N_2O_7$ (561.72). Calculated (percent): C, 66.29; H, 8.79; N, 4.99. Found (percent) C, 66.29; H, 9.17; N, 5.38.

From the compound of K-value 3.4 3.2 g. of the salt resulted M.P. 211 to 212° C.; $[\alpha]_{578}$+26.5° (c.=1, dimethylformamide), (yield: 29.5%, related to tyrosine).

$C_{26}H_{41}N_2O_5$ (461.61). Calculated (percent): C, 67.63; H, 8.95; N, 6.08. Found (percent): C, 67.50; H, 9.02; N, 6.15.

Separation of the two derivatives may also be accomplished by direct precipitation of the dicyclohexylammonium salts. There was obtained from 9 g. of the crude reaction product under 30 ml. of ether with the addition of 5 g. of dicyclohexylamine, a crude product melting at 160° C. After recrystallization from ethyl acetate and dioxane, 4.8 g. of the mono-BOC derivative were obtained of M.P. 210 to 211°. From the mother liquors there were obtained 11.5 g. of the bis-BOC compound of M.P. 114 to 115° C.

For characterization, both acyl derivatives were converted into activated esters after liberation from their dicyclohexylammonium salts with 0.1 N $H_2SO_4$. As examples the syntheses of the p-nitrophenyl ester and of the N-hydroxy-succinimide ester are given.

(A) Derivatives of BOC-Tyr(BOC)-OH)

(1) p-Nitrophenyl ester: 4.8 g. of syrupy bis-BOC-tyrosine (12.6 mmoles) were dissolved in 20 ml. of absolute tetrahydrofuran and after the addition of 1.81 g. of p-nitrophenol (13 mmoles) 2.7 g. of dicyclohexylcarbodiimide (13 mmoles) were introduced. After 20 hours it was filtered off from the separated dicyclohexylurea (2.9 g.) and the filtrate concentrated under vacuum. The syrupy residue was taken up in an ethyl acetate. After the addition of petroleum ether, 3 g. (66%) of the compound of M.P. 148 to 150° C. crystallized. After recrystallization from methylenechloride/petroleum ether and good washing with ether/petroleum ether 1:2, 2.75 g. remained with a M.P. of 152 to 154° C. $[\alpha]_{578}^{22}$−2.5° (c.=1, dioxane).

Calculated for $C_{25}H_{30}N_2O_9$ (502.5) (percent): C, 59.75; H, 6.02; N, 5.57. Found (percent): C, 59.47; H, 6.10; N, 5.23.

(2) N-hydroxysuccinimide ester: In analogous manner the N-hydroxysuccinimide ester was prepared and after recrystallization from dioxane-petroleum ether a yield of 77% was obtained. M.P. 95 to 97° C.; $[\alpha]_{578}^{22}$+3.5° (c.=1, in dioxane).

Calculated for $C_{23}H_{30}N_2O_9$ (478.48) (percent): C, 57.73; H, 6.32; N, 5.85. Found (percent): C, 57.75; H, 6.72; N, 5.68.

(3) 2,4,5-trichlorophenyl ester: The 2,4,5-trichlorophenyl ester can also be prepared in analogous manner. After recrystallization from acetic ester/petroleum ether the compound melts at 158 to 160° C. $[\alpha]_{578}^{23}$—18.5° (c.=1.1, in dioxane).

$C_{20}H_{20}Cl_3NO_5$ (460.74). Calculated (percent): C, 52.16; H, 4.38; N, 3.05; Cl, 23.02. Found (percent): C, 52.26; H, 4.48; N, 3.20; Cl, 22.69.

(B) Derivatives of BOC-Tyr-OH (1) p-Nitrophenyl ester: 4.5 g. of amorphous

BOC-Tyr-OH were dissolved in 30 ml. of absolute tetrahydrofuran together with 2.2 g. of p-nitrophenol (16 moles). After cooling to —5° C., 3.3 g. of dicyclohexylcarbodiimide were added to the solution and the mixture was kept overnight in the icebox. The dicyclohexylurea (3.5 g.) which had separated off was removed by filtration and the filtrate concentrated in a vacuum. The reddish syrup was taken up with ethyl acetate. By addition of petroleum ether yellow crystals formed which were recrystallized from methylenechloride/petroleum ether. The crystals were washed with diisopropylether-ether 1:5. Yield: 4.2 g. (64%), M.P. 164 to 166° C. $[\alpha]_{578}^{22}$+12.3° C. (c.=1, in dioxane).

$C_{20}H_{22}N_2O_7$ (402.40). Calculated (percent): C, 59.69; H, 5.51; N, 6.96. Found (percent): C, 59.83; H, 5.93; N, 6.83.

(2) N-hydroxysuccinimide ester: The N-hydroxysuccinimide ester was prepared in an analogous manner in absolute tetrahydrofuran. After recrystallization from ethylacetate/petroleum ether the derivative is obtained in 88% yield with a M.P. of 180 to 182° C.; $[\alpha]_{578}^{22}$—12.5° (c.=1, in dioxane).

$C_{18}H_{22}N_2O_7$ (378.38). Calculated (percent): C, 57.13; H, 5.86; N, 7.40. Found (percent): C, 57.38; H, 6.16; N, 6.98.

EXAMPLE VIII p-Methoxybenzyloxycarbonyl-fluoride (MZ-fluoride)

In a three-necked flask of 500 cc. capacity, provided with stirrer, thermometer and a reflux condenser kept at —70° C., there are placed 75 cc. absolute methylene chloride and 31 g. of 80% carbonylchloride-fluoride (0.3 mole) are subsequently condensed at a bath temperature of —70° C. A mixture of 34.5 g. (0.25 mole) of p-methoxybenzyl alcohol, 20 g. (0.25 mole) of absolute pyridine in 75 cc. absolute methylene chloride is slowly introduced dropwise, while stirring, within one hour (condenser temperature —70° C.; sump temperature —70° C.). In the course of half an hour the reaction temperature of the mixture is allowed to rise to —10° C., and the methylene chloride is then completely distilled off at a bath temperature of —10° C. in a water pump vacuum (12 mm. Hg). The residue is mixed with 150 cc. of absolute ether and filtered off with suction from the solid pyridine hydrochloride. After washing twice with 100 cc. of absolute ether each time, the ether is removed off in a vacuum (12 mm. Hg) at a bath temperature of 0° C. The last traces of solvent are removed in a high vacuum (0.4 mm. Hg); bath temperature 0° C.

The yield of crude product (oil) amounts to 45 g. (98% of theory), $n_D^{20}$: 1.4985.

The compound no longer shows an alcohol band in the infra-red spectrum; the carbonyl band lies at 1820 cm.$^{-1}$.

*Analysis:* Calculated for $C_9H_9FO_3$ (184.17) (percent): F, 10.3. Found (percent): F, 9.8.

The compound is stable in the refrigerator for some days, but spontaneously decomposes above 35° C. with $CO_2$ evolution. No noticeable decomposition occurs at —30° C. even after several weeks.

EXAMPLE IX

General synthesis instruction for obtaining p-methoxybenzyloxycarbonyl amino acids 10 moles of amino acid were suspended in 15 ml. of 70% dioxane. The suspension was cooled to —5° C. and 3.5 ml. of a crude approximately 40% solution of p-methoxybenzyloxycarbonyl-fluoride in methylene chloride were then added. A 4 N sodium hydroxide solution was then added at a pH of 8.3 to 8.5 while stirring vigorously and maintaining the pH value constant by means of an autotitrator. When the reaction had ceased (30 to 50 minutes), the temperature was allowed to reach room temperature after removal of the cooling bath, and stirring was continued for a further 30 minutes. The mixture was then filtered off from undissolved components and extracted twice with 15 ml. of ether each time. After cooling to 0° C., the aqueous phase was acidified with 30% acetic acid, and the acyl derivatives were extracted with ether or ethyl acetate. The combined extracts were washed several times with a small amount of water and concentrated. There was thus obtained either directly a crystalline residue or there remained a syrup which generally crystallized under ether. Only MZ-methionine did not crystallize, but was isolated and characterized as its dicyclohexylammonium salt. The crude products were recrystallized either from ether/petroleum ether or from ethyl acetate/petroleum ether; the derivative of methionine was recrystallized from ethanol.

EXAMPLE X

Furfuryloxcarbonyl-fluoride (FOC-fluoride)

75 cc. of absolute methylene chloride are placed into a three-necked flask of 500 cc. capacity, provided with stirrer, thermometer and a reflux condenser kept at —70° C., and 31 g. of 80% carbonylchloride-fluoride (0.3 mol) are condensed at a bath temperature of —70° C. A mixture of 24.5 g. (0.25 mol) of freshly distilled furfuryl alcohol, 20 g. (0.25 mol) of absolute pyridine in 75 ml. of absolute methylene chloride are added dropwise during one hour, while stirring (temperature of the condenser —70° C., sump temperature —70° C.). The reaction temperature is allowed to rise to —25° C. in the course of about a half hour, and the methylene chloride is then completely distilled off in a vacuum at a bath temperature of —25° C. The residue is mixed with 150 ml. of absolute ether and the solution is filtered off with suction from the solid pyridine hydrochloride. After washing twice with portions of 100 ml. absolute ether, the solvent is removed in a vacuum (12 mm. Hg), finally in a high vacuum (0.4 mm. Hg) at a bath temperature of —25° C.

The yield of crude product (a slightly greenish oil) amounts to 33 g. (92% of theory) $n_D^{22}$: 1.4381.

The compound had no longer an alcohol band in the infra-red spectrum; the carbonyl band lies at 1820 cm.$^{-1}$.

The solution is only stable for a prolonged time in solution (methylene chloride) at temperatures below —30° C. The substance decomposes at room temperature within a few minutes with $CO_2$ evolution.

EXAMPLE XI 3,4,5-trimethoxybenzyloxycarbonyl-fluoride (TMZ-fluoride)

In a three-necked flask of 250 cc. capacity, provided with stirrer, thermometer and a reflux condenser kept at —70° C., there are placed 50 cc. absolute methylene chloride and 12 g. of 80% carbonylchloride-fluoride (0.116 mole) are subsequently condensed at a bath temperature of —70° C. A mixture of 20 g. (0.1 mole) of 3,4,5-trimethoxybenzyl alcohol, 8 g. (0.1 mole) of absolute pyridine in 25 cc. of absolute methylene chloride is slowly introduced dropwise, while stirring, within one hour (condenser temperature —70° C.; sump temperature —70° C.). In the course of half an hour the reaction temperature of the mixture is allowed to rise to —10° C., and the methylene chloride is then completely distilled off at a bath temperature of —10° C. in a water pump vacuum (12 mm. Hg). The residue is mixed with 300 cc. of absolute ether and filtered off with suction from the solid pyridine hydrochloride. After washing three times with 100 cc. of absolute ether each time, the ether is removed off in a vacuum (12 mm. Hg) at a bath temperature of 0° C.

The last traces of solvent are removed in a high vacuum (0.1 mm. Hg.; bath temperature)

The yield of crude product (white crystals; M.P. 45 to 53° C. with red coloration and decomposition amounts to 22 g. (90% of theory).

The compound no longer shows an alcohol band in the infra-red spectrum; the carbonyl band lies at 1830 cm.$^{-1}$.

$C_{11}H_{13}FO_5$ (244.22). Calculated (percent): F, 7.77. Found (percent): F, 7.10.

The compound is stable in the refrigerator for a prolonged period, but slowly decomposes at a temperature above 40° C. with the evolution of gas and red coloration.

EXAMPLE XII

General instruction for the synthesis of furfuryloxycarbonylamino acids 10 moles of amino acids were suspended in 10 ml. of 50% dioxane. After cooling to −5° C., there were added, while stirring vigorously, 3 ml. of an approximately 40% solution of crude furfuryloxycarbonyl-fluoride in methylene chloride or dioxane, and such an amount of 4 N NaOH that the pH of the solution retained the adjacent value (autitrator). When the alkali absorption slowed down, the cooling device was removed and the reaction was allowed to continue at room temperature for a further 60 minutes. The solution was then filtered off from undissolved material, washed with some water, and the filtrate was extracted twice with portions of 15 ml. ether. After cooling to 0° C., the aqueous phases were acidified with 30% acetic acid, and the FOC derivatives formed were immediately extracted several times with ether or ethyl acetate. The extracts were repeatedly washed with water and finally concentrated in a vacuum. The residual sirup was taken up in ether or ethyl acetate and, after addition of the calculated amount of dicyclohexylamine, the crystallized dicyclohexylammonium salts were precipitated either directly or addition of petroleum ether. The properties of the resultant compounds are set out in the table. FOC-glycine and FOC-alanine were also characterized as free acids after decomposing the dicyclohexylammonium salts with 10% citric acid under ether. In the case of asparagine, the desired FOC-Asn-OH directly precipitated in crystalline form upon acidification with acetic acid. After filtration, the product was thoroughly washed with a small amount of water and a sample recrystallized from ethanol/ethyl acetate.

EXAMPLE XIII 3,4,5-trimethoxybenzyloxycarbonylglycine (a) Via 3,4,5 - trimethoxybenzyloxycarbonylfluoride: 0.75 g. (10 mmole) of glycine were dissolved in 10 ml. of 50% dioxane and after cooling to −5° C., 2.5 g. of 3,4,5-TMZ-fluoride introduced into the solution. 4 N NaOH was added under vigorous stirring and automatic pH control at pH 8.5. After the absorption of alkali has come to a stop, the reaction mixture was allowed to come to room temperature and worked up for another hour. This was filtered off with suction from a slimy filling, while still alkaline extracted with 30 ml. of ether and finally acidified with citric acid. For extraction a total of 100 ml. of ether was used in four portions and the combined extracts were concentrated in vacuum. The remaining syrup, 2.4 g., 79%, was taken up in ether. 1.4 g. of dicyclohexylamine were added to the solution scratching of which resulted in 2.9 g. of colorless crystals. M.P. 134–136° with previous sintering. A sample was recrystallized from ethanol-ethyl acetate with the addition of ether and petroleum ether and then melted at 145–147°.

(b) Via isocyanate: The isocyanate produced from 1.4 g. of glycine ethyl ester-hydrochloride with phosgene [W. Siefken, Liebigs Ann. Chem. 562, 105 (1949)] was mixed with 20 ml. of absolute ether at 0° with a solution of 2 g. of 3,4,5-trimethoxybenzyl alcohol in 10 ml. of dry dioxane. The reaction mixture was held overnight in the icebox and the solution concentrated in vacuum. Then the syrupy residue was dissolved in a mixture of 18 ml. of dioxane and 2 ml. of water and 6 ml. of 2 N caustic soda was added at 0° and under vigorous stirring. After 15 minutes the ice bath was removed and allowed to come to room temperature. After a total of one hour this was twice extracted with 15 ml. of ether, the aqueous phase mixed with strong citric acid up to the acid reaction and extracted with ethyl acetate (3×20 ml.). The combined extracts were washed repeatedly with water, concentrated in vacuum to dryness and the residue was taken up in ether. The addition of dicyclohexylamine (1.5 g.) resulted in 2.3 g. (49%) of the desired derivative.

EXAMPLE XIV 3,4,5-trimethyoxybenzyloxycarbonyl-L-aspargine 1.5 g. of L-asparaginemonohydrate (10 mmoles) were finely pulverized and suspended in 10 ml. of 50% dioxane. After cooling of the suspension to −5°, 2.5 g. of TMZ-fluoride (ca. 10 mmoles) were introduced into the suspension and 4 N NaOH was added under cooling and vigorous stirring so that the pH remained at 8.5. After an hour the temperature of the reaction mixture was allowed to come to room temperature gradually and was worked up after a further hours. After filtration with suction and extraction with ether, it was acidified with citric acid and subsequently extracted with 4×30 ml. of ethyl acetate. 0.9 of (28%) of M.P. 144 to 146° C. were obtained from the extracts after repeated washing with a little water and concentration. The aqueous phase was kept in the ice box on standing a second crop crystallized 1.05 g. (30%) of the desired compound with a M.P. of 158–159°. After recrystallization from ethanol-ethyl acetate, the M.P. was 164–165°.

EXAMPLE XV

N-α,N-im-Bis-3,4,5-trimethoxybenzyloxycarbonyl-L-histidine 2.1 g. of L-histidine-monohydrochloride-monohydrate (10 mmoles) were, as described repeatedly, reacted in 10 ml. of dioxane-water at pH 8.3 with 2.5 g. of TMZ-fluoride. After one hour, 2.5 g. of TMZ-fluoride were introduced again into the reaction solution and allowed to react for further 3 hours at pH 6.8 at first under cooling and finally at room temperature. The mixture was acidified after extraction with 30 ml. of ether and extracted again with 3× 25 ml. portions of ether. The ethereal extracts were extracted repeatedly with water and finally concentrated in vacuum. A syrupy residue remained which solidified in a vacuum to an amorphous foam. M.P. 40 to 50° C.; yield: 3.25 g. (58% of theory).

EXAMPLE XVI 3,4,5-trimethoxybenzyloxycarbonyl-L-aspartic acid 1.3 g. of aspartic acid were reacted as usual in 10 ml. of aqueous dioxane under initial cooling and vigorous stirring with 2.5 g. of 3,4,5-trimethoxybenzyloxycarbonylfluoride. After 1.5 hours the reaction solution was extracted with 30 ml. of ether, the aqueous phase acidified with citric acid and extracted with 100 ml. of ethyl acetate in 3 portions. The extracts were washed well with a saturated sodium chloride solution and water and finally dried in vacuum. The syrupy residue, 3.2 g. (90%) was distributed in the system methanol:water:chloroform:

carbontetrachloride=8:2:5:5:

and the fraction of K-value ∼5.6 concentrated, dried well and finally crystallized under ether. Yield: 2.5 g. (72% of theory) of M.P. 148 to 150° C. (with sintering).

What is claimed is:
1. Benzyloxy carbonyl fluoride unsubstituted or substituted by 1 to 3 methoxy moieties.
2. The compound of claim 1 which is p-methoxybenzyloxycarbonyl fluoride.
3. The compound of claim 1 which is 3,4,5-trimethoxybenzyloxycarbonyl fluoride.

References Cited

Chemical Abstract of Dutch patent 6,409,091, 1965, vol. 63, column 2926d.

Emeléus et. al.: J. Chem. Soc. (1948), p. 2183–6.
Groggins: Unit Processes in Organic Chemistry, N.Y., McGraw-Hill (1947), third edition, pages 640–641.

ALEX MAZEL, Primary Examiner
B. F. DENTZ, Assistant Examiner

U.S. Cl. X.R.
260—112.5